(12) United States Patent
Zach et al.

(10) Patent No.: US 6,904,976 B1
(45) Date of Patent: Jun. 14, 2005

(54) POWERED SOIL TILLAGE DEVICE

(76) Inventors: Lawrence J. Zach, 3453 18th Ave., Columbus, NE (US) 68601; Alois J. Kosch, 307 Pershing Rd., Columbus, NE (US) 68601

( * ) Notice: Subject to any disclaimer, the term of this patent is extended or adjusted under 35 U.S.C. 154(b) by 0 days.

(21) Appl. No.: 10/720,805

(22) Filed: Nov. 24, 2003

(51) Int. Cl.[7] .......................... A01B 33/00; A01B 1/10
(52) U.S. Cl. ........................ 172/41; 172/371
(58) Field of Search ............... 172/41, 42, 97, 172/329, 371, 378

(56) References Cited

U.S. PATENT DOCUMENTS

| | | | |
|---|---|---|---|
| 287,248 A | 10/1883 | Coyle | 172/84 |
| 1,624,610 A | 4/1927 | Matson | 172/84 |
| 1,743,195 A | 1/1930 | Ditlevsen | 172/41 |
| 1,827,074 A | 10/1931 | Ditlevsen | 172/41 |
| 2,550,522 A | 4/1951 | Bolongaro | 172/40 |
| 2,580,936 A | 1/1952 | Lytle | 172/42 |
| 2,604,833 A | 1/1952 | Lytle | 172/84 |
| 2,792,769 A * | 5/1957 | Harshberger | 172/40 |
| 3,057,412 A | 10/1962 | Hovis, Jr. | 172/42 |
| 3,710,870 A | 1/1973 | Pfeiffer | 172/40 |
| 4,096,915 A | 6/1978 | Groth | 172/42 |
| 4,122,902 A * | 10/1978 | Alexander | 172/41 |
| 4,305,470 A * | 12/1981 | Anderson | 172/41 |
| 4,353,422 A * | 10/1982 | Bennett, Jr. | 172/41 |
| 4,452,316 A * | 6/1984 | Edwards | 172/41 |
| 4,541,492 A | 9/1985 | Motruk | 172/41 |
| 4,648,464 A * | 3/1987 | Huxley | 172/36 |
| 4,811,794 A | 3/1989 | Greene | 172/43 |
| 5,048,617 A * | 9/1991 | Haven | 172/42 |
| 5,172,768 A | 12/1992 | Straus | 172/89 |
| 5,540,287 A * | 7/1996 | Zaharia et al. | 172/111 |
| 5,988,290 A | 11/1999 | Banks | 172/21 |
| 6,382,325 B1 * | 5/2002 | Bovi | 172/41 |

FOREIGN PATENT DOCUMENTS

RU 2125780 C * 2/1999

* cited by examiner

Primary Examiner—Robert E. Pezzuto
Assistant Examiner—Nathan Mammen
(74) Attorney, Agent, or Firm—Thomte, Mazour & Niebergall; Dennis L. Thomte (57) ABSTRACT

A powered, lightweight soil tillage device, including an elongated hollow support member having a motor and handle at the upper end thereof, and the tillage assembly mounted at the lower end thereof. The tillage assembly comprises a pair of beams which are mounted on opposite sides of a gearbox and driven thereby. The upper ends of the beams are attached to idler or rocker beams so that each of the beams is moved in a generally circular path. Hoe blades or the like are secured to the forward ends of the beams and extend inwardly therefrom so that the hoe blades are disposed one behind the other.

11 Claims, 5 Drawing Sheets

POWERED SOIL TILLAGE DEVICE

BACKGROUND OF THE INVENTION

1. Field of the Invention

This invention relates to a powered soil tillage device, and more particularly to a lightweight, hand-held powered soil tillage device. More specifically, the powered soil tillage device of this invention is used to cultivate soil in preparation for seeding or planting, for loosening and aeration of soil to benefit plant development, and for the removal of weeds or unwanted vegetation in gardens, fields or similar plots.

2. Description of the Related Art

Various methods have been used for tilling or cultivating the soil, including manually operated hoes, spades, shovels, rakes and similar devices, which are labor-intensive and time-consuming.

Various powered tillage devices employ rotary tillage members, often disc-shaped with serrated teeth or tine-like protrusions. These machines or devices are commonly known as rototillers and present safety hazards as the rotating discs, blades or tines can cause significant injury if contact occurs with the machine operator, other people, pets, etc. The rotary motion of the tillage members can also snag and entangle clothing, which can also lead to injury. During operation, devices of this type may lurch forward, causing unsafe and difficult operation, especially when the rotating tillage members strike plant roots, rocks or other objects, or when the soil conditions are inconsistent with hard and soft zones. To reduce this condition, some rototillers utilize powered drive wheels or tracks to propel the machine forward.

Rotary tillage machines cannot be easily maneuvered or guided around or between individual plants, obstacles or garden plot contours due to the drive wheel-like pulling or grabbing action of the rotating tillage members as they move through the soil. As such, these machines are normally restricted to cultivating between rows of plants or where straight-line motion is possible for some distance. Rototiller-type machines also tend to entangle weeds, vines, etc. as they snag and wrap such materials around the rotating tillage members, requiring stoppage of the machine and manual clearing of the debris.

Another form of tillage or cultivation often associated with farms, and to a lesser extent, garden plots, is to pull or push blades, discs or tines through the soil while submerged or partially submerged in the soil. This movement can be performed manually or by utilizing tractors or similar power sources as the propelling force. Such devices do not till or churn in the soil as thoroughly as other means and generally are better suited for larger fields or areas where maneuverability and ease of steerage is of limited importance.

Other tillage-powered devices consist of blades or clam-like shovels that open and close or penetrate and twist the soil. These devices tend to be complex and in general provide limited soil cultivation effectiveness, and their use is not widespread.

SUMMARY OF THE INVENTION

A hand-held, powered soil tillage device of lightweight design is described and includes an elongated hollow support member having upper and lower ends, with a handle being provided on the upper end of the support member. A power means, such as an electric motor or internal combustion engine, is mounted on the upper end of the hollow support member and has a power shaft extending downwardly therefrom through the interior of the hollow support member. A gearbox is mounted on the lower end of the hollow support member and has a spur gear in mesh with a worm gear which is mounted on the lower end of the power shaft. The spur gear is mounted on a drive shaft for rotation therewith with the ends of the drive shaft extending outwardly from opposite sides of the gearbox housing. A first crank arm is secured to one end of the drive shaft, and a second crank arm is secured to the other end of the drive shaft. The first and second crank arms are offset 180 degrees with respect to one another. First and second elongated beams are pivotably secured, intermediate their lengths, to the crank arms, respectively. The upper ends of the first and second beams are secured to rocker arms which are pivotably connected to a support secured to the hollow support member above the gearbox. Hoe blades are secured to the forward or lower ends of the first and second beams, respectively, and are positioned thereon in a transverse relationship with respect to the longitudinal axes thereof.

As the power means rotates the power shaft, the power shaft rotates the worm gear, which in turn rotates the spur gear to cause the first and second crank arms to rotate. As the offset crank arms rotate, one beam is moving forward and/or upward while the other beam is moving backward and/or downward such that when one blade is entering the soil, the other blade located behind it (or in front of it, depending on the machine set-up) is exiting the soil. During operation, one blade moves up and over the other blade creating a nearly constant hoeing action which minimizes impact jarring and twisting action to provide full coverage of the zone being tilled to assure severance of weed roots and the like.

It is therefore a principal object of the invention to provide an improved powered soil tillage device.

Still another object of the invention is to provide a hand-held, powered soil tillage device which is lightweight and which is easily handled.

Still another object of the invention is to provide a powered soil tillage device which specifically causes the hoe blades to penetrate the soil in a manner to till the same.

A further object of the invention is to provide a powered soil tillage device which may be either driven by an electric motor or an internal combustion engine. Still another object of the invention is to provide a powered soil tillage device wherein the ground-engaging members may comprise hoe blades, spikes, etc. A further object of the invention is to provide a powered soil tillage device which is highly maneuverable.

Still another object of the invention is to provide a powered soil tillage device which is easily operated around and between individual plants, obstacles and confined or contoured spaces.

Still another object of the invention is to provide a powered soil tillage device which reduces the tendency to entangle vines, weeds and the like.

Still another object of the invention is to provide a powered soil tillage device which provides the same effective soil penetrating-slicing-churning-lifting action as a manually-operated garden hoe without the manual effort associated therewith.

Still another object of the invention is to provide a powered soil tillage device which is safe to use.

These and other objects will be obvious to those skilled in the art.

DESCRIPTION OF THE PREFERRED EMBODIMENT

Figure 1:
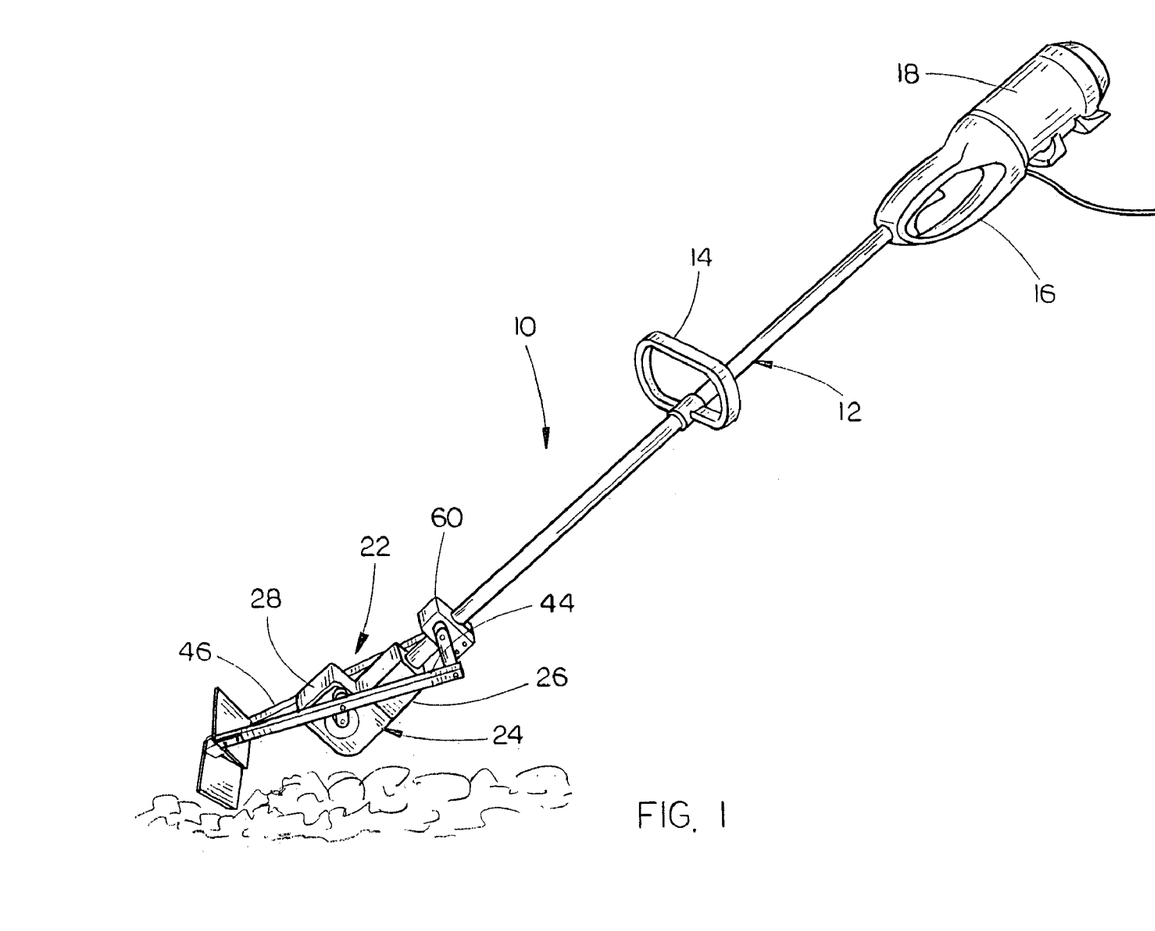
FIG. 1 is a perspective view of the tillage device of this invention.

The powered soil tillage device of this invention is referred to generally by the reference numeral 10. The tillage device 10 of this invention is designed to be lightweight so as to be hand-held. The tillage device 10 includes an elongated hollow support member 12 having upper and lower ends. A handle 14 is secured to the support member 12 intermediate the ends thereof to enable a person to grasp the same with one hand. A handle 16 is secured to the upper end of the support member 12 and is of conventional design. A power means 18 is secured to the handle 16 in conventional fashion and may comprise an electric motor or an internal combustion engine. Further, the electric motor may be battery-operated if desired. The upper end of a power shaft 20, which is normally flexible, is secured to the power means and is driven thereby. The power shaft 20 extends downwardly through the interior of support member 12 to the lower end of the support member in conventional fashion. To this point, the structure described is that found on a Craftsman® Weedwacker® line trimmer. Applicant has removed the line trimmer apparatus normally found on the lower end of the Craftsman® device and substituted the soil tillage assembly of this invention.

Although the preferred embodiment of the invention includes structure as set forth immediately above, the power means 18 may be located at any location on the device. Further, the support member 12 need not necessarily be hollow since the power shaft 20 could be located at the exterior surface of the support member 12. Additionally, the power means 18 could be belt connected or chain connected to the tillage devices located at the lower end of the support member as will be described hereinafter.

Figure 2:
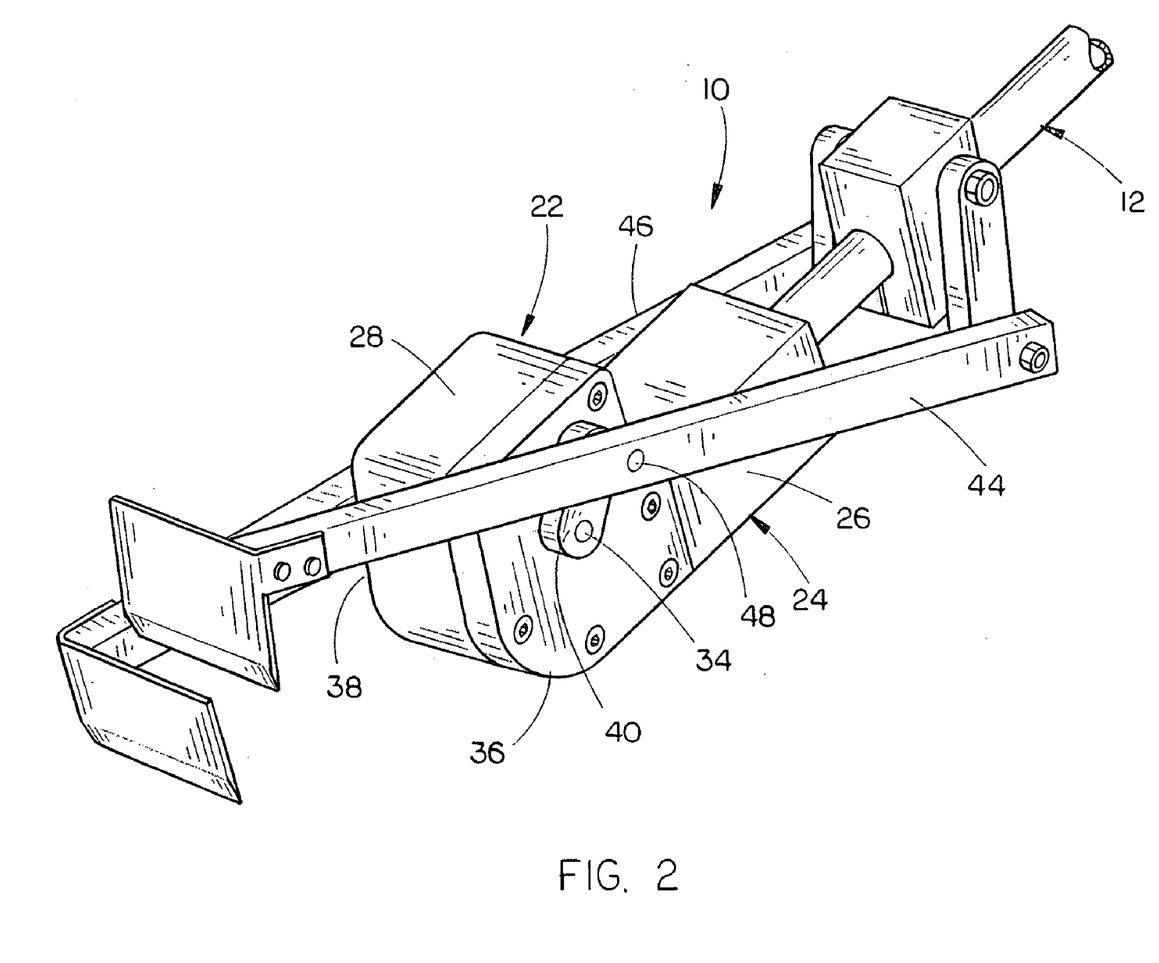
FIG. 2 is a perspective view of the lower portion of the tillage device of this invention.
Figure 3:
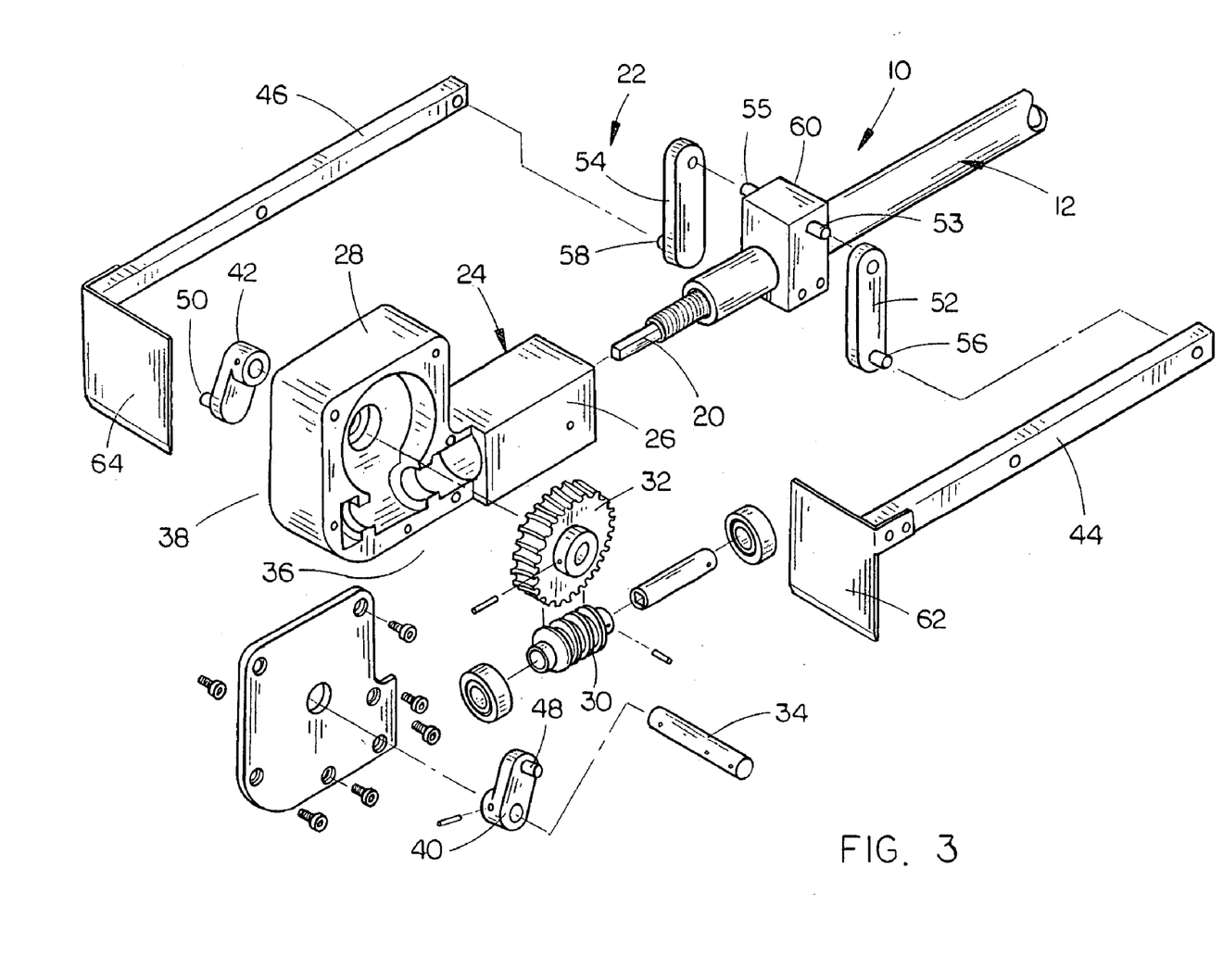
FIG. 3 is an exploded perspective view of the lower portion of the tillage device of this invention.
Figure 4:
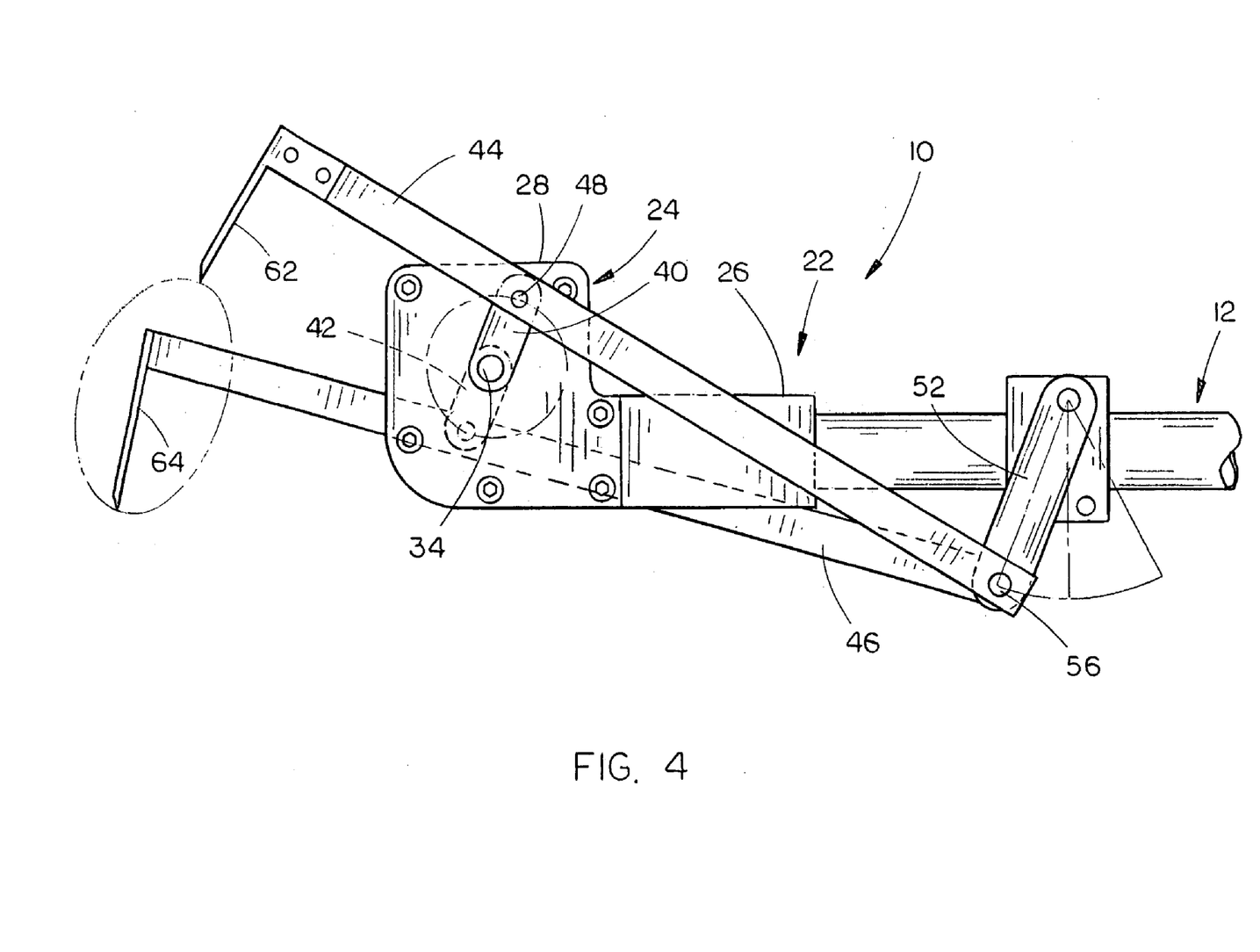
FIG. 4 is a side elevational view of the lower portion of the tillage device of this invention.

The numeral 22 refers to the soil tillage assembly which is mounted on the lower end of the support member 12 as will now be described. Assembly 22 includes an L-shaped gearbox housing 24, including a first housing portion 26 and a second housing portion 28 which extends upwardly from the lower end of the first housing portion 26. Although the gearbox housing 24 is shown to be L-shaped, the housing could take other shapes as well.

Figure 5:
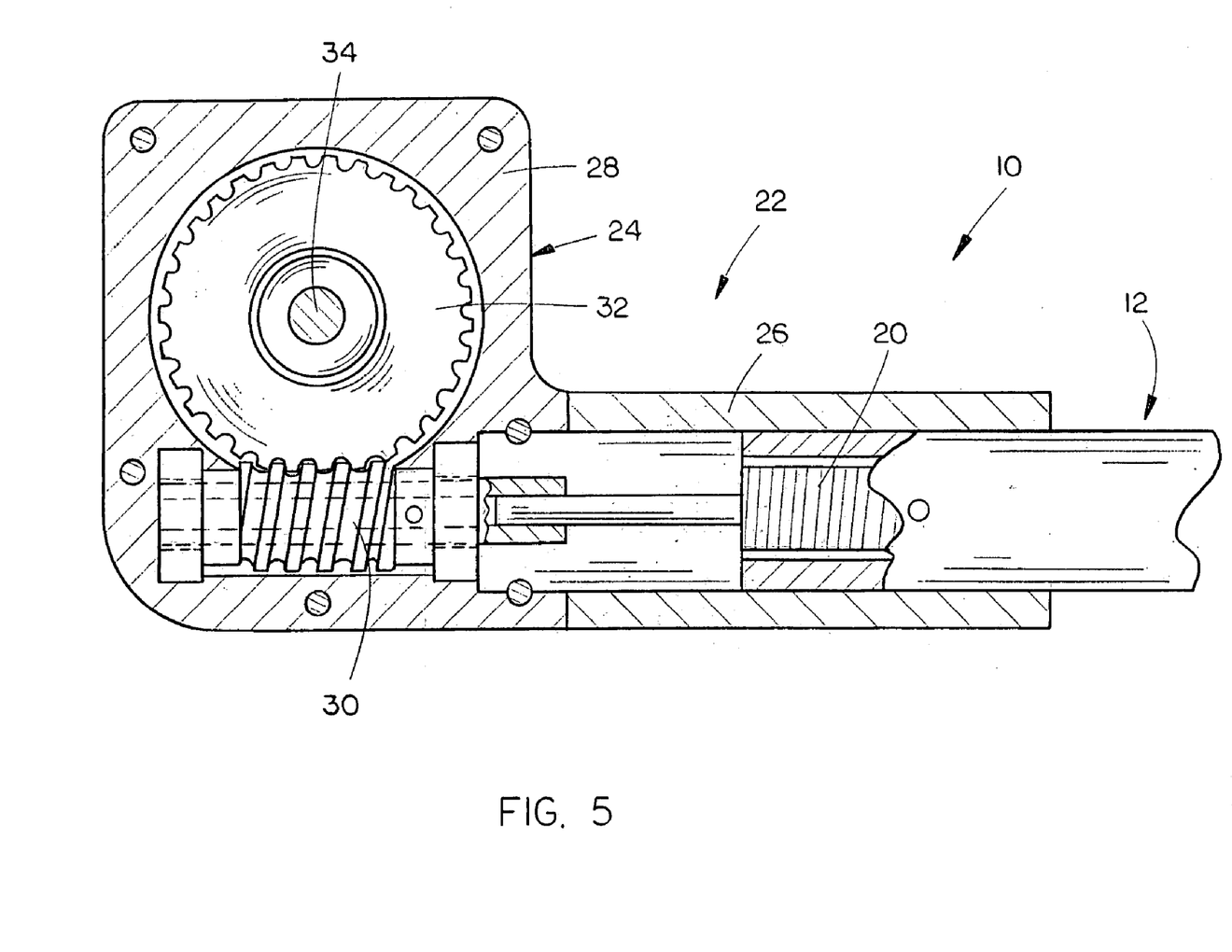
FIG. 5 is a partial sectional view of the gearbox of the tillage device of this invention.

A worm gear 30 is rotatably mounted within housing portion 26 and is secured to the lower end of the power shaft 20 for rotation therewith. The worm gear 30 is in mesh with a spur gear 32 rotatably mounted within gearbox housing 24 and which has a drive shaft 34 extending therethrough and secured thereto for rotation therewith. For purposes of description, the gearbox housing 24 will be described as having opposite sides 36 and 38. One end of drive shaft 34 rotatably extends outwardly through side 36 of housing 24 with the other end of the drive shaft 34 extending outwardly through side 38 of housing 24. One end of crank arm 40 is secured to one end of the drive shaft 34 outwardly of side 36 of housing 24. One end of crank arm 42 is secured to the other end of drive shaft 34 outwardly of side 38 of housing 24. The crank arms 40 and 42 are offset 180 degrees from one another, as seen in the drawings.

The numerals 44 and 46 refer to elongated beams positioned on opposite sides of the housing 24. Beam 44 is rotatably connected to crank arm 40 by pin or shaft 48. Beam 46 is pivotably connected to crank arm 42 by means of a pin or shaft 50. The rearward ends of beams 44 and 46 are pivotally connected to the lower ends of rocker arms 52 and 54, respectively, by bolts or pins 56 and 58, respectively. The other ends of the rocker arms 52 and 54 are rotatably connected to a support 60, at 53 and 55 respectively, which is secured to the support member 12 above gearbox housing 24 as seen in the drawings. Hoe blades 62 and 64 are selectively removably secured to the lower or forward ends of the beams 44 and 46, respectively, as seen in the drawings. Preferably, the hoe blades 62 and 64 are constructed of a hardened high carbon-steel material. As seen in the drawings, the hoe blade 62 extends inwardly from the lower or forward end of the beam 44, and the hoe blade 64 extends inwardly from the lower or forward end of beam 46 so that the hoe blades 62 and 64 are positioned in a nearly identical center-line position, one to the other in a fore and aft position, or one behind the other. Although the devices are shown as including hoe blades 62 and 64, the preferred hoe blades could be replaced by spikes or other devices if different tillage operations are required to be performed.

When the power means 18 is energized, the power shaft 20 is rotated to cause spur gear 32 to rotate, which in turn rotates drive shaft 34. Drive shaft 34 causes crank arms 40 and 42 to be rotated so that the crank arms swing through a circular path, which in turn drives the beams 44 and 46 in a circular motion at their connection point. With one end of the beam attached to the rocker arm, and the crank arm propelling the beam between the ends, the hoe blade is driven in a pattern that is very similar to the working end of a manual hoe. Each crank arm is 180 degrees offset from the other crank arm such that when one crank arm extends upwardly, the other extends downwardly, and so on. Since the crank arms are 180 degrees offset from one another, one beam is moving forward and/or upward, while the other is moving backward and/or downward such that when one hoe blade is entering the soil, the other, located behind it (or in front of it, depending on the machine's setup), is exiting the soil. The hoe blades are attached perpendicular to the beams such that the blades are essentially parallel with each other. During operation, one hoe blade moves up and over the other, creating a nearly constant hoeing action and providing full coverage of the zone being tilled to assure severance of weed roots and the like.

The preferred embodiment of the invention includes the structure as set forth immediately above. However, the tillage members could be driven by means other than a worm gear and spur gear enclosing within a housing 24. For example, the beams 44 and 46 could be driven by a chain drive, a belt drive, etc. Additionally, the beams could be reciprocated by structure other than that shown and described. For example, the rocker arms 52 and 54 could be replaced with a different reciprocating means such as a slide mechanism, etc.

The tillage device of this invention is lightweight and is easily handled. The device is highly maneuverable and may be easily moved between plants in an irregular pattern to conform to contoured areas.

Thus it can be seen that the invention accomplishes at least all of its stated objectives.

We claim:
1. A powered soil tillage device, comprising:
an elongated, hollow support member having upper and lower ends;
a handle on said support member at the upper end thereof;
a power means on said support member at the upper end thereof;
a power shaft extending from said power means downwardly through said hollow support member;
a gearbox on said support member at the lower end thereof and having first and second sides; said gearbox being operatively connected to and driven by said power shaft;
said gearbox including a driven, transversely extending first shaft rotatable about a generally horizontal axis, with first and second ends positioned outwardly of said first and second sides of said gearbox;
a first elongated crank arm having first and second ends;
a second elongated crank arm having first and second ends;
said first end of said first crank arm being secured to said first end of said first shaft in a transversely disposed relationship thereto for rotation with said first shaft;
said first end of said second crank arm being secured to said second end of said first shaft in a transversely disposed relationship thereto for rotation with said first shaft;
said first and second crank arms being offset with respect to one another approximately 180 degrees;
a support secured to said hollow support member between said gearbox and said upper end of said hollow support member and having first and second sides;
a first elongated rocker arm having first and second ends;
a second elongated rocker arm having first and second ends;
said first end of said first rocker arm being rotatably secured to said support at said one side thereof;
said first end of said second rocker arm being rotatably secured to said support at said second side thereof;
a first elongated beam having first and second ends;
a second elongated beam having first and second ends;
said first end of said first beam being rotatably secured to said second end of said first rocker arm;
said first end of said second beam being rotatably secured to said second end of said second rocker arm;
said first beam being rotatably secured, intermediate its length, to said second end of said first crank arm;
said second beam being rotatably secured, intermediate its length, to said second end of said second crank arm;
said second ends of said first and second beams being positioned beyond said lower end of said hollow support member;
a first hoe blade secured to said second end of said first beam; and
a second hoe blade secured to said second end of said second beam;
said gearbox comprising an L-shaped housing including:
(a) a first housing portion which has upper and lower ends and which is generally aligned with and secured to the lower end of said elongated support member, and
(b) a second housing portion extending upwardly from said lower end of said first housing portion;
said gearbox having a first gear secured to the lower end of said power shaft for rotation therewith, and a second gear in mesh with said first gear;
said second gear being mounted on said first shaft for rotation therewith.

2. The soil tillage device of claim 1 wherein said first gear comprises a worm gear and wherein said second gear comprises a spur gear.

3. A powered soil tillage device, comprising:
an elongated support member having upper and lower ends;
a handle on said support member;
a power means on said support member and including a power shaft;
a gearbox on said support member at the lower end thereof and having first and second sides; said gearbox being operatively connected to and driven by said power shaft;
said gearbox including a driven, transversely extending first shaft rotatable about a generally horizontal axis, with first and second ends positioned outwardly of said first and second sides of said gearbox;
a first elongated crank arm having first and second ends;
a second elongated crank arm having first and second ends;
said first end of said first crank arm being secured to said first end of said first shaft in a transversely disposed relationship thereto for rotation with said first shaft;
said first end of said second crank being secured to said second end of said first shaft in a transversely disposed relationship thereto for rotation with said first shaft;
said first and second crank arms being offset with respect to one another approximately 180 degrees;
a support secured to said elongated support member between said gearbox and said upper end of said elongated support member and having first and second sides;
a first elongated rocker arm having first and second ends;
a second elongated rocker arm having first and second ends;
said first end of said first rocker arm being rotatably secured to said support at said one side thereof;
said first end of said second rocker arm being rotatably secured to said support at said second side thereof;
a first elongated beam having first and second ends;
a second elongated beam having first and second ends;
said first end of said first beam being rotatably secured to said second end of said first rocker arm;
said first end of said second beam being rotatably secured to said second end of said second rocker arm;
said first beam being rotatably secured, intermediate its length, to said second end of said first crank arm;
said second beam being rotatably secured, intermediate its length, to said second end of said second crank arm;
said second ends of said first and second beams being positioned beyond said lower end of said support member;
a first tillage member secured to said second end of said first beam; and
a second tillage member secured to said second end of said second beam;
each of said first and second tillage members comprising first and second hoe blades, respectively, and wherein said hoe blades are disposed transversely with respect to the longitudinal axes of said beams;
said gearbox comprising an L-shaped housing including:
(a) a first housing portion which has upper and lower ends and which is generally aligned with and secured to the lower end of said elongated support member; and
(b) a second housing portion extending upwardly from said lower end of said first housing portion;

said gearbox having a first gear secured to the lower end of said power shaft for rotation therewith, and a second gear in mesh with said first gear;

said second gear being mounted on said first shaft for rotation therewith.

4. The soil tillage device of claim 3 wherein said first gear comprises a worm gear and wherein said second gear comprises a spur gear.

5. A powered soil tillage device, comprising:

an elongated, hollow support member having upper and lower ends;

a handle on said support member at the upper end thereof;

a power means on said support member at the upper end thereof;

a power shaft extending from said power means downwardly through said hollow support member;

a gearbox on said support member at the lower end thereof and having first and second sides; said gearbox being operatively connected to and driven by said power shaft;

said gearbox including a driven, transversely extending first shaft rotatable about a generally horizontal axis, with first and second ends positioned outwardly of said first and second sides of said gearbox;

a first elongated crank arm having first and second ends;

a second elongated crank arm having first and second ends;

said first end of said first crank arm being secured to said first end of said first shaft in a transversely disposed relationship thereto for rotation with said first shaft;

said first end of said second crank arm being secured to said second end of said first shaft in a transversely disposed relationship thereto for rotation with said first shaft;

said first and second crank arms being offset with respect to one another approximately 180 degrees;

a support secured to said hollow support member between said gearbox and said upper end of said hollow support member and having first and second sides;

a first elongated rocker arm having first and second ends;

a second elongated rocker arm having first and second ends;

said first end of said first rocker arm being rotatably secured to said support at said one side thereof;

said first end of said second rocker arm being rotatably secured to said support at said second side thereof;

a first elongated beam having first and second ends;

a second elongated beam having first and second ends;

said first end of said first beam being rotatably secured to said second end of said first rocker arm;

said first end of said second beam being rotatably secured to said second end of said second rocker arm;

said first beam being rotatably secured, intermediate its length, to said second end of said first crank arm;

said second beam being rotatably secured, intermediate its length, to said second end of said second crank arm;

said second ends of said first and second beams being positioned beyond said lower end of said hollow support member;

a first hoe blade secured to said second end of said first beam; and a second hoe blade secured to said second end of said second beam;

said first hoe blade having an inwardly extending blade portion which extends inwardly from said first beam;

said second hoe blade having an inwardly extending blade portion which extends inwardly from said second beam;

said inwardly extending blade portions being positioned in an approximate center-line position, one behind the other.

6. The soil tillage device of claim 5 wherein each of said hoe blades are disposed transversely with respect to the longitudinal axes of said beams.

7. A powered soil tillage device, comprising:

an elongated support member having upper and lower ends;

a handle on said support member;

a power means on said support and including a power shaft;

a gearbox on said support member at the lower end thereof and having first and second sides; said gearbox being operatively connected to and driven by said power shaft;

said gearbox including a driven, transversely extending first shaft rotatable about a generally horizontal axis, with first and second ends positioned outwardly of said first and second sides of said gearbox;

a first elongated crank arm having first and second ends;

a second elongated crank arm having first and second ends;

said first end of said first crank arm being secured to said first end of said first shaft in a transversely disposed relationship thereto for rotation with said first shaft;

said first end of said second crank being secured to said second end of said first shaft in a transversely disposed relationship thereto for rotation with said first shaft;

said first and second crank arms being offset with respect to one another approximately 180 degrees;

a support secured to said elongated support member between said gearbox and said upper end of said elongated support member and having first and second sides;

a first elongated rocker arm having first and second ends;

a second elongated rocker arm having first and second ends;

said first end of said first rocker arm being rotatably secured to said support at said one side thereof;

said first end of said second rocker arm being rotatably secured to said support at said second side thereof;

a first elongated beam having first and second ends;

a second elongated beam having first and second ends;

said first end of said first beam being rotatably secured to said second end of said first rocker arm;

said first end of said second beam being rotatably secured to said second end of said second rocker arm;

said first beam being rotatably secured, intermediate its length, to said second end of said first crank arm;

said second beam being rotatably secured, intermediate its length, to said second end of said second crank arm;

said second ends of said first and second beams being positioned beyond said lower end of said support member;

a first tillage member secured to said second end of said first beam; and a second tillage member secured to said second end of said second beam;

said first tillage member having an inwardly extending portion which extends inwardly from said first beam;

said second tillage member having an inwardly extending portion which extends inwardly from said second beam;

said inwardly extending portions being positioned in an approximate center-line position, one behind the other.

8. A powered soil tillage device, comprising:

an elongated support member having upper and lower ends;

a handle on said support member;

a power means on said support;

a drive mechanism on said support member; said drive mechanism being operatively connected to and driven by said power means;

a first elongated beam reciprocatably mounted on said support member; having first and second ends;

a second elongated beam reciprocatably mounted on said support member; having first and second ends;

said first and second beams being laterally spaced from one another;

said first and second beams being connected to said drive mechanism;

said drive mechanism causing said first and second beams to be reciprocatably moved in an offset manner with respect to one another;

said second ends of said first and second beams being positioned beyond said lower end of said support member;

a first tillage member secured to said second end of said first beam; and a second tillage member secured to said second end of said second beam;

said first tillage member having an inwardly extending portion which extends inwardly from said first beam;

said second tillage member having an inwardly extending portion which extends inwardly from said second beam;

said inwardly extending portions being positioned in an approximate center-line position, one behind the other.

9. The soil tillage device of claim 8 wherein each of said first and second tillage members comprise first and second hoe blades, respectively, and wherein said hoe blades are disposed transversely with respect to the longitudinal axes of said beams.

10. The soil tillage device of claim 8 wherein rocker arms reciprocatably secure said first and second beams to said support member.

11. The soil tillage device of claim 10 wherein offset crank arms connect said drive mechanism to said first and second beams intermediate the lengths thereof.

* * * * *